(12) United States Patent
Lachat et al.

(10) Patent No.: US 8,407,968 B2
(45) Date of Patent: Apr. 2, 2013

(54) METHOD OF PACKAGING AN INFLATABLE AIRBAG CUSHION INCLUDING A WRAPPER AND DEPLOYMENT FLAP

(75) Inventors: Michael Lachat, Shelby Township, MI (US); Anna Libby, Lake Orion, MI (US); Howard Lusk, Rochester, MI (US); Jesse Benny, Bangalore (IN); Lucette Bond, Ogden, UT (US)

(73) Assignee: Autoliv ASP, Inc., Ogden, UT (US)

( * ) Notice: Subject to any disclaimer, the term of this patent is extended or adjusted under 35 U.S.C. 154(b) by 504 days.

(21) Appl. No.: 12/580,488

(22) Filed: Oct. 16, 2009

(65) Prior Publication Data

US 2011/0088356 A1    Apr. 21, 2011

(51) Int. Cl.
*B65B 17/00* (2006.01)
*B65B 63/04* (2006.01)
*B60R 21/16* (2006.01)

(52) U.S. Cl. ...................................... 53/429; 280/743.1
(58) Field of Classification Search .................... 53/429, 53/117, 120, 159; 280/731, 732, 743.1, 743.2
See application file for complete search history.

(56) References Cited

U.S. PATENT DOCUMENTS

| | | | |
|---|---|---|---|
| 3,748,477 A | 7/1973 | Wulbrecht | |
| 4,235,453 A | 11/1980 | Lawson et al. | |
| 4,286,954 A | 9/1981 | McArthur et al. | |
| 4,351,544 A | 9/1982 | Ross | |
| 4,842,300 A | 6/1989 | Ziomek et al. | |
| 5,004,266 A | 4/1991 | Miller et al. | |
| 5,022,675 A | 6/1991 | Zelenak et al. | |
| 5,140,799 A | 8/1992 | Satoh | |
| 5,162,035 A * | 11/1992 | Baker ........................... | 493/405 |
| 5,178,407 A | 1/1993 | Kelley | |
| 5,240,282 A | 8/1993 | Wehner et al. | |
| 5,246,250 A | 9/1993 | Wolanin et al. | |
| 5,290,061 A | 3/1994 | Bollaert | |
| 5,310,216 A | 5/1994 | Wehner et al. | |
| 5,346,248 A | 9/1994 | Rhein et al. | |
| 5,391,137 A * | 2/1995 | DePoy et al. ................. | 493/405 |
| 5,398,968 A | 3/1995 | Emambakhsh et al. | |
| 5,407,227 A | 4/1995 | Lauritzen et al. | |
| 5,419,579 A | 5/1995 | McPherson et al. | |
| 5,425,551 A | 6/1995 | Hawthorn | |

(Continued)

FOREIGN PATENT DOCUMENTS

JP    06255437 A    9/1994
JP    2005 343267    12/2005

(Continued)

OTHER PUBLICATIONS

Notice of Allowance mailed Apr. 1, 2011 in co-pending U.S. Appl. No. 12/259,221, now published as U.S. Publication No. US 2009/0102173.

(Continued)

*Primary Examiner* — Stephen F Gerrity
(74) *Attorney, Agent, or Firm* — Stoel Rives LLP

(57) ABSTRACT

A deployment flap can be used with inflatable airbag to reduce the risk of the airbag getting caught between the instrument panel of a vehicle and an out of position occupant. The manner in which the airbag and deployment flap are folded prior to deployment alters their deployment characteristics, such as trajectory.

28 Claims, 17 Drawing Sheets

U.S. PATENT DOCUMENTS

| | | | |
|---|---|---|---|
| 5,447,329 A | 9/1995 | Hamada | |
| 5,452,913 A | 9/1995 | Hansen | |
| 5,454,595 A | 10/1995 | Olson et al. | |
| 5,492,363 A | 2/1996 | Hartmeyer et al. | |
| 5,492,367 A | 2/1996 | Albright et al. | |
| 5,493,846 A * | 2/1996 | Baker et al. | 53/429 |
| 5,496,056 A | 3/1996 | Dyer | |
| 5,531,477 A | 7/1996 | Madrigal et al. | |
| 5,538,281 A | 7/1996 | Patercsak | |
| 5,570,905 A | 11/1996 | Dyer | |
| 5,588,674 A | 12/1996 | Yoshimura et al. | |
| 5,613,698 A | 3/1997 | Patercsak et al. | |
| 5,630,614 A | 5/1997 | Conlee | |
| 5,669,204 A * | 9/1997 | Blaisdell | 53/429 |
| 5,694,737 A | 12/1997 | Lunt et al. | |
| 5,732,973 A | 3/1998 | Turnbull et al. | |
| 5,755,078 A * | 5/1998 | Hurtig et al. | 53/429 |
| 5,755,459 A | 5/1998 | LaLonde | |
| 5,765,867 A | 6/1998 | French | |
| 5,772,239 A | 6/1998 | Seymour | |
| 5,823,566 A | 10/1998 | Manire | |
| 5,823,567 A | 10/1998 | Behr et al. | |
| 5,899,495 A | 5/1999 | Yamamoto et al. | |
| 5,957,486 A | 9/1999 | Taguchi et al. | |
| 5,979,937 A | 11/1999 | Yoshida et al. | |
| 6,029,996 A | 2/2000 | Yoshioka et al. | |
| 6,056,318 A | 5/2000 | Braunschadel | |
| 6,070,904 A | 6/2000 | Ozaki et al. | |
| 6,110,094 A | 8/2000 | Wallentin et al. | |
| 6,131,944 A | 10/2000 | Henkel et al. | |
| 6,142,517 A | 11/2000 | Nakamura et al. | |
| 6,155,598 A | 12/2000 | Kutchey | |
| 6,186,544 B1 | 2/2001 | Igawa | |
| 6,196,585 B1 | 3/2001 | Igawa | |
| 6,203,062 B1 | 3/2001 | Kusaka et al. | |
| 6,206,409 B1 | 3/2001 | Kato et al. | |
| 6,286,866 B1 | 9/2001 | Satge et al. | |
| 6,299,202 B1 | 10/2001 | Okada et al. | |
| 6,352,283 B1 | 3/2002 | Ellerbrok et al. | |
| 6,371,510 B1 | 4/2002 | Marriott et al. | |
| 6,390,500 B1 * | 5/2002 | Yamada et al. | 280/743.1 |
| 6,398,258 B2 | 6/2002 | Hamada et al. | |
| 6,432,033 B1 | 8/2002 | Salzmann et al. | |
| 6,474,686 B1 | 11/2002 | Higuchi et al. | |
| 6,499,765 B2 | 12/2002 | Hawthorn et al. | |
| 6,557,891 B2 | 5/2003 | Okada et al. | |
| 6,619,691 B1 | 9/2003 | Igawa | |
| 6,669,229 B2 | 12/2003 | Thomas | |
| 6,682,093 B2 | 1/2004 | Tajima et al. | |
| 6,692,024 B2 | 2/2004 | Fischer et al. | |
| 6,739,622 B2 | 5/2004 | Halford et al. | |
| 6,767,030 B2 | 7/2004 | Yamaji et al. | |
| 6,830,266 B2 | 12/2004 | Abe | |
| 6,832,779 B2 | 12/2004 | Tajima et al. | |
| 6,874,810 B2 | 4/2005 | Soderquist | |
| 6,877,772 B2 | 4/2005 | Fischer et al. | |
| 6,883,381 B2 | 4/2005 | Kolb et al. | |
| 6,883,831 B2 * | 4/2005 | Hawthorn et al. | 280/739 |
| 6,942,242 B2 | 9/2005 | Hawthorn et al. | |
| 6,945,562 B2 | 9/2005 | Abe | |
| 6,955,377 B2 | 10/2005 | Cooper et al. | |
| 6,971,671 B2 | 12/2005 | Schneider et al. | |
| 6,988,743 B2 | 1/2006 | Okamoto et al. | |
| 7,083,191 B2 | 8/2006 | Fischer | |
| 7,150,470 B2 | 12/2006 | Okada et al. | |
| 7,223,224 B2 | 5/2007 | Card et al. | |
| 7,232,153 B2 | 6/2007 | Kawauchimaru et al. | |
| 7,237,802 B2 | 7/2007 | Rose et al. | |
| 7,293,795 B2 | 11/2007 | Kong | |
| 7,314,228 B2 | 1/2008 | Ishiguro et al. | |
| 7,347,450 B2 | 3/2008 | Williams et al. | |
| 7,396,044 B2 | 7/2008 | Bauer et al. | |
| 7,404,570 B2 | 7/2008 | Miyata | |
| 7,441,804 B2 | 10/2008 | Rose et al. | |
| 7,441,805 B2 | 10/2008 | Jamison et al. | |
| 7,445,239 B2 | 11/2008 | Okada et al. | |
| 7,481,455 B2 | 1/2009 | Iida et al. | |
| 7,530,597 B2 | 5/2009 | Bito | |
| 7,597,355 B2 | 10/2009 | Williams et al. | |
| 7,607,690 B2 | 10/2009 | Abe et al. | |
| 7,631,894 B2 | 12/2009 | Hasebe et al. | |
| 7,651,130 B2 | 1/2010 | Bauberger | |
| 7,712,781 B2 | 5/2010 | Klinkenberger et al. | |
| 7,726,685 B2 | 6/2010 | Abe et al. | |
| 7,731,230 B2 | 6/2010 | Fischer et al. | |
| 7,735,862 B2 | 6/2010 | Choi | |
| 7,770,925 B2 | 8/2010 | Seymour et al. | |
| 7,845,682 B2 | 12/2010 | Lachat et al. | |
| 7,857,347 B2 | 12/2010 | Abe et al. | |
| 7,878,538 B2 | 2/2011 | Abe et al. | |
| 7,878,539 B2 | 2/2011 | Maripudi et al. | |
| 7,926,844 B2 | 4/2011 | Williams | |
| 7,931,297 B2 | 4/2011 | Abe et al. | |
| 7,938,444 B2 | 5/2011 | Williams et al. | |
| 7,942,442 B2 | 5/2011 | Rose et al. | |
| 7,959,184 B2 | 6/2011 | Fukawatase et al. | |
| 8,070,183 B2 | 12/2011 | Kumagai et al. | |
| 8,226,118 B2 | 7/2012 | Rose et al. | |
| 2002/0020990 A1 | 2/2002 | Sinnhuber et al. | |
| 2003/0001366 A1 | 1/2003 | Debler et al. | |
| 2003/0189319 A1 | 10/2003 | Soderquist | |
| 2003/0234520 A1 * | 12/2003 | Hawthorn et al. | 280/728.1 |
| 2004/0251669 A1 | 12/2004 | Fischer et al. | |
| 2005/0134032 A1 | 6/2005 | Downing et al. | |
| 2006/0012157 A1 | 1/2006 | Ishiguro et al. | |
| 2006/0071459 A1 | 4/2006 | Hayakawa et al. | |
| 2006/0131847 A1 | 6/2006 | Sato et al. | |
| 2006/0244248 A1 | 11/2006 | Rose et al. | |
| 2007/0052221 A1 | 3/2007 | Okada et al. | |
| 2007/0057487 A1 | 3/2007 | Kim | |
| 2007/0120346 A1 | 5/2007 | Kwon | |
| 2007/0126219 A1 | 6/2007 | Williams | |
| 2007/0138779 A1 | 6/2007 | Kwon | |
| 2007/0170710 A1 | 7/2007 | Bouquier | |
| 2007/0278772 A1 | 12/2007 | Burghardt et al. | |
| 2008/0023950 A1 | 1/2008 | Kalczynski et al. | |
| 2008/0203713 A1 | 8/2008 | McFadden et al. | |
| 2008/0217887 A1 * | 9/2008 | Seymour et al. | 280/728.2 |
| 2008/0217892 A1 | 9/2008 | Maripudi et al. | |
| 2008/0284140 A1 | 11/2008 | Choi | |
| 2009/0039630 A1 | 2/2009 | Schneider et al. | |
| 2009/0102173 A1 * | 4/2009 | Rose et al. | 280/743.1 |
| 2009/0108574 A1 * | 4/2009 | Lachat et al. | 280/743.1 |
| 2009/0152842 A1 | 6/2009 | Benny et al. | |
| 2009/0256340 A1 | 10/2009 | Williams et al. | |
| 2011/0031725 A1 | 2/2011 | Rose et al. | |
| 2011/0121548 A1 | 5/2011 | Maripudi et al. | |

FOREIGN PATENT DOCUMENTS

| | | |
|---|---|---|
| WO | WO 2008/109202 | 9/2008 |

OTHER PUBLICATIONS

Office Action mailed Dec. 27, 2010 in co-pending U.S. Appl. No. 11/956,101, now published as U.S. Publication No. US-2009/0152842.

Restriction Requirement mailed Oct. 27, 2011 in co-pending U.S. Appl. No. 12/536,360, now published as U.S. Publication No. US 2011/0031725.

Amendment and Response to Requirement of Election of Species filed Nov. 17, 2011 in co-pending U.S. Appl. No. 12/536,360, now published as U.S. Publication No. US 2011/0031725.

Amendment and Response to Office Action and Request for Continued Examination filed Dec. 13, 2010 in co-pending U.S. Appl. No. 11/956,101, now published as U.S. Publication No. US-2009/0152842.

Office Action issued Apr. 9, 2007 in co-pending U.S. Appl. No. 11/115,928, now U.S. Patent No. 7,441,804.

Amendment and Response to Office Action filed Jul. 23, 2007 in co-pending U.S. Appl. No. 11/115,928, now U.S. Patent No. 7,441,804.

Office Action issued Oct. 17, 2007 in co-pending U.S. Appl. No. 11/115,928, now U.S. Patent No. 7,441,804.

Amendment and Response to Office Action filed Feb. 5, 2008 in co-pending U.S. Appl. No. 11/115,928, now U.S. Patent No. 7,441,804.

Office Action issued Feb. 27, 2008 in co-pending U.S. Appl. No. 11/115,928, now U.S. Patent No. 7,441,804.
Amendment and Response to Office Action filed May 5, 2008 in co-pending U.S. Appl. No. 11/115,928, now U.S. Patent No. 7,441,804.
Notice of Allowance issued Aug. 26, 2008 in co-pending U.S. Appl. No. 11/115,928, now U.S. Patent No. 7,441,804.
Restriction Requirement issued Dec. 9, 2008 in co-pending U.S. Appl. No. 11/714,349, now published as U.S. Publication No. US-2008-0217887.
Response to Requirement for Election of Species filed Feb. 9, 2009 in co-pending U.S. Appl. No. 11/714,349, now published as U.S. Publication No. US-2008-0217887.
Office Action issued Jun. 11, 2009 in co-pending U.S. Appl. No. 11/714,349, now published as U.S. Publication No. US-2008-0217887.
Amendment and Response to Office Action filed Dec. 11, 2009 in co-pending U.S. Appl. No. 11/714,349, now published as U.S. Publication No. US-2008-0217887.
Notice of Allowance issued Mar. 2, 2010 in co-pending U.S. Appl. No. 11/714,349, now published as U.S. Publication No. US-2008-0217887.
Request for Continued Examination filed Mar. 11, 2010 in co-pending U.S. Appl. No. 11/714,349, now published as U.S. Publication No. US-2008-0217887.
Notice of Allowance issued Apr. 8, 2010 in co-pending U.S. Appl. No. 11/714,349, now published as U.S. Publication No. US-2008-0217887.
Restriction Requirement issued Feb. 5, 2010 in in co-pending U.S. Appl. No. 12/100,465, now published as U.S. Publication No. US-2009-0256340.
Amendment and Response to Requirement for Election of Invention and Election of Species filed Apr. 5, 2010 in co-pending U.S. Appl. No. 12/100,465, now published as U.S. Publication No. US-2009-0256340.
Office Action issued May 19, 2010 in co-pending U.S. Appl. No. 12/100,465, now published as U.S. Publication No. US-2009-0256340.
Office Action issued Jun. 9, 2010 in co-pending U.S. Appl. No. 12/259,221, now published as U.S. Publication No. US-2009-0102173.
Notice of Allowance issued Jun. 23, 2010 in co-pending U.S. Appl. No. 12/349,341, now published as U.S. Publication No. US-2009-0108574.
International Search Report/Written Opinion from PCT International Application No. PCT/US2008/052201 dated Aug. 1, 2008, now published as WO 2008/109202.
Office Action issued Dec. 9, 2009 in co-pending U.S. Appl. No. 11/956,101, now published as U.S. Publication No. US-2009/0152842.
Amendment and Response to Office Action filed May 28, 2010 in co-pending U.S. Appl. No. 11/956,101, now published as U.S. Publication No. US-2009/0152842.
Office Action issued Jun. 11, 2010 in co-pending U.S. Appl. No. 11/956,101, now published as U.S. Publication No. US-2009/0152842.
Amendment and Response to Office Action filed Nov. 19, 2010 in co-pending U.S. Appl. No. 12/100,465.
Notice of Allowance and Fee(s) Due mailed Dec. 15, 2010 in co-pending U.S. Appl. No. 12/100,465.
Terminal Disclaimer Review Decision issued Oct. 6, 2010 in co-pending U.S. Appl. No. 12/259,221.
Restriction Requirement mailed Nov. 22, 2010 in co-pending U.S. Appl. No. 12/259,221.
Amendment and Response to Requirement of Election of Species filed Dec. 22, 2010 in co-pending U.S. Appl. No. 12/259,221.
Amendment and Response to Office Action filed Dec. 19, 2011 in co-pending U.S. Appl. No. 11/956,101, now published as U.S. Publication No. US-2009/0152842.
Final Office Action mailed Jan. 5, 2012 in co-pending U.S. Appl. No. 11/956,101, now published as U.S. Publication No. US-2009/0152842.
Amendment and Response filed May 27, 2011 in co-pending U.S. Appl. No. 11/956,101, now published as U.S. Publication No. US-2009/0152842.
Office Action mailed Jun. 17, 2011 in co-pending U.S. Appl. No. 11/956,101, now published as U.S. Publication No. US-2009/0152842.
Office Action issued Jun. 19, 2009 in U.S. Appl. No. 11/804,146, now U.S. Patent No. 7,735,862.
Amendment and Response to Office Action issued Jun. 19, 2009 in U.S. Appl. No. 11/804,146, now U.S. Patent No. 7,735,862.
Notice of Allowance and Fee(s) Due issued Feb. 25, 2010 in U.S. Appl. No. 11/804,146, now U.S. Patent No. 7,735,862.
Examiner's Amendment issued May 10, 2010 in U.S. Appl. No. 11/804,146, now U.S. Patent No. 7,735,862.
Response to Office Action and Terminal Disclaimer filed Sep. 9, 2010 in co-pending U.S. Appl. No. 12/259,221.
Request for Continued Examination filed Jul. 16, 2010 in co-pending U.S. Appl. No. 12/349,341.
Notice of Allowance issued Aug. 12, 2010 in co-pending U.S. Appl. No. 12/349,341.
U.S. Appl. No. 12/536,360, filed Aug. 5, 2009, titled Safety Venting With Passively Closeable Vents.
Notice of Allowance and Fee(s) Due mailed Mar. 28, 2012 in co-pending U.S. Appl. No. 12/536,360, now published as U.S. Publication No. US 2011/0031725.
Notice of Allowance and Fee(s) Due mailed Jun. 18, 2012 in co-pending U.S. Appl. No. 11/956,101, now published as U.S. Publication No. US-2009/0152842.

* cited by examiner

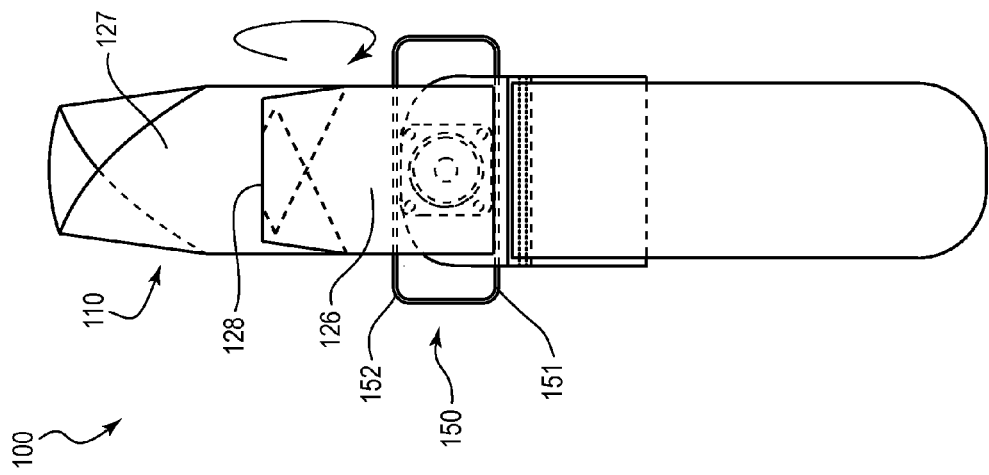
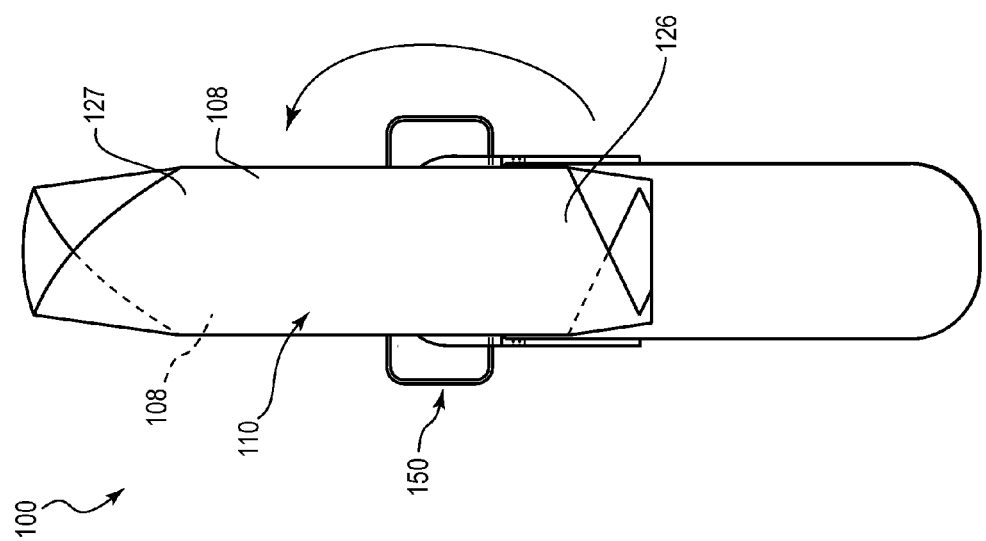

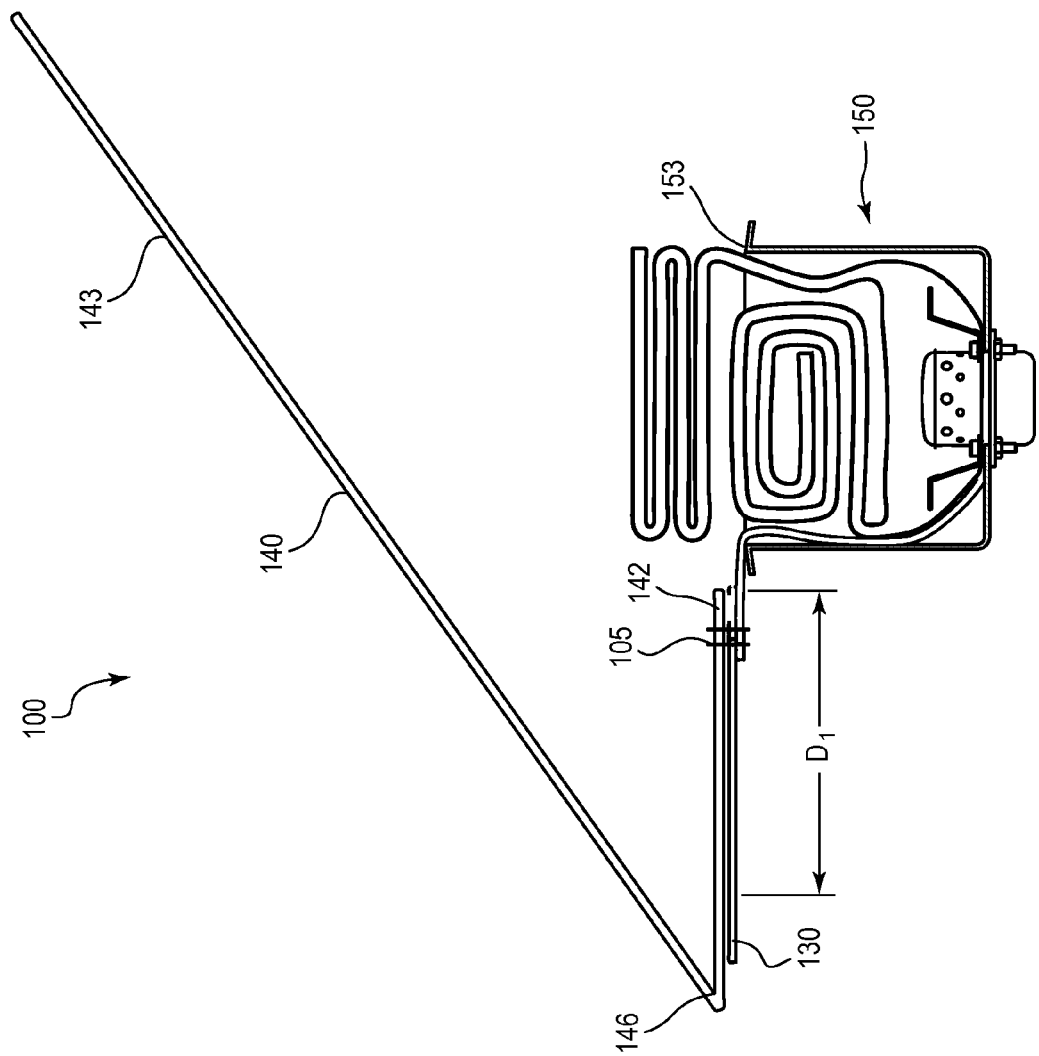

US 8,407,968 B2

METHOD OF PACKAGING AN INFLATABLE AIRBAG CUSHION INCLUDING A WRAPPER AND DEPLOYMENT FLAP

TECHNICAL FIELD

The present disclosure relates generally to the field of automotive protective systems. More specifically, the present disclosure relates to inflatable airbag cushions with a deployment flap, which is folded according to a predetermined method.

BRIEF DESCRIPTION OF THE DRAWINGS

The present embodiments will become more fully apparent from the following description and appended claims, taken in conjunction with the accompanying drawings. Understanding that the accompanying drawings depict only typical embodiments, and are, therefore, not to be considered to be limiting of the disclosure's scope, the embodiments will be described and explained with specificity and detail in reference to the accompanying drawings.

FIG. 6 is a top elevation view of the airbag assembly of FIG. 4 after side portions of the airbag has been folded inwardly.

FIG. 7 is a top elevation view of the airbag assembly of FIG. 6 after a bottom portion of the airbag has been folded upwardly.

FIG. 13A is a cross-sectional view of the airbag assembly of FIG. 12 after a deployment flap has been accordion-folded.

DETAILED DESCRIPTION OF PREFERRED EMBODIMENTS

It will be readily understood that the components of the embodiments as generally described and illustrated in the figures herein could be arranged and designed in a wide variety of different configurations. Thus, the following more detailed description of various embodiments, as represented in the figures, is not intended to limit the scope of the disclosure, as claimed, but is merely representative of various embodiments. While the various aspects of the embodiments are presented in drawings, the drawings are not necessarily drawn to scale unless specifically indicated.

The phrases "connected to," "coupled to" and "in communication with" refer to any form of interaction between two or more entities, including mechanical, electrical, magnetic, electromagnetic, fluid, and thermal interaction. Two components may be coupled to each other even though they are not in direct contact with each other. The term "abutting" refers to items that are in direct physical contact with each other, although the items may not necessarily be attached together.

Inflatable airbag systems are widely used to minimize occupant injury in a collision scenario. Airbag modules have been installed at various locations within a vehicle, including, but not limited to, the steering wheel, the instrument panel, within the side doors or side seats, adjacent to roof rail of the vehicle, in an overhead position, or at the knee or leg position. In the following disclosure, "airbag" may refer to an inflatable curtain airbag, overhead airbag, front airbag, or any other airbag type.

Front airbags are typically installed in the steering wheel and instrument panel of a vehicle. During installation, the airbags are rolled, folded, or both, and are retained in the rolled/folded state behind a cover. During a collision event, vehicle sensors trigger the activation of an inflator, which rapidly fills the airbag with inflation gas. Thus the airbag rapidly changes confirmations from the rolled/folded configuration to an expanded configuration.

Figure 1:
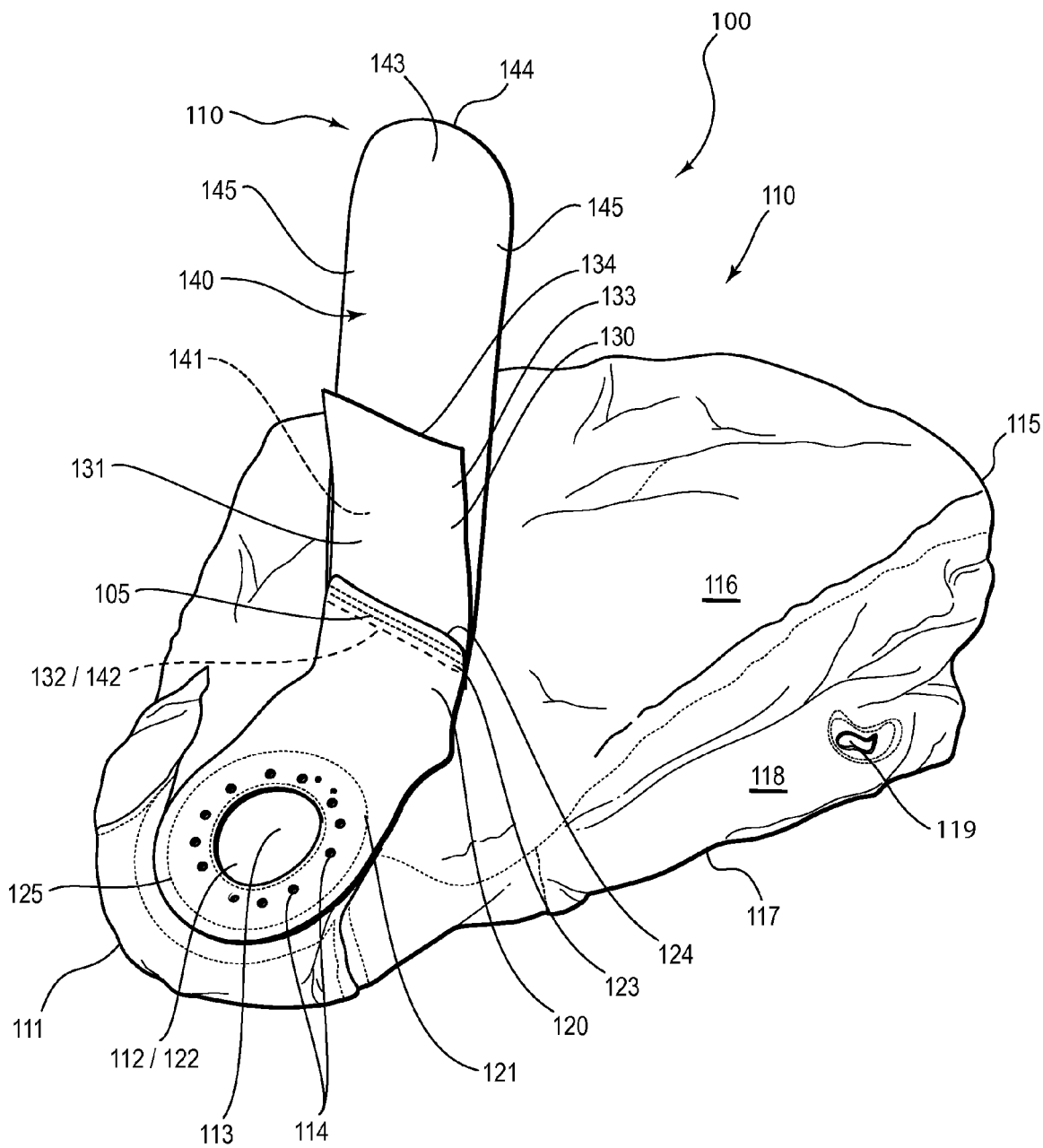
FIG. 1 is a perspective view of an inflatable airbag with a deployment flap, wherein the airbag comprises a portion of an airbag assembly.

FIG. 1 is a perspective view of a portion of an inflatable airbag assembly 100, which may comprise an inflatable airbag 110, a throat flap 120, a wrapper 130, and a deployment flap 140. Airbag 110 may comprise a throat portion 111 that has an inflator aperture 112, which is contiguous with an inflatable void 113 and may be coupled to a housing (not shown) via mounting structures 114. Inflatable airbag 110 also comprises a front face 115, a top face 117 a bottom face 116, a side face 118, and a vent 119. Top face 117 of cushion 110 is the portion of the cushion that is closest to the headliner of a vehicle when the cushion is in a deployed state. Bottom face 116 is below top face 117 when cushion 110 is in a deployed state, and is closest to a floor of the vehicle. The term "bottom face" is not necessarily limited to the portion of cushion 110 that is below a horizontal medial plane of the cushion, but may include less than half, more than half or exactly half of the bottom portion of the cushion. Likewise, the term "top face" is not necessarily limited to the portion of cushion 110 that is above a horizontal medial plane of the cushion, but may include less than half, more than half or exactly half of the top portion of the cushion.

Throat flap 120 is an optional component of assembly 100 and may be used to reinforce airbag 110 at the housing mounting structures 114, as well as protect portions of airbag 110 during deployment. Throat flap 120 may comprise a throat proximal portion 121 that has an aperture 122 that coincides with inflator aperture 112. Throat flap 120 also has a throat-distal portion 123 that ends with a distal edge 124. Throat flap 120 may be coupled to airbag 110 via stitching 125, which in the depicted embodiment circumnavigates aperture 122.

Wrapper 130 may comprise a frangible material, or a non-frangible material that has been rendered frangible via a rupture point that can comprise perforations or a weakened portion. Wrapper 130 may comprise a throat-proximal portion 131 that terminates in a throat-proximal edge 132 and a throat-distal portion 133 that terminates in a throat-distal edge 134. Wrapper 130 is configured to wrap around a packaged inflatable airbag and aid in retaining the airbag within the airbag housing.

Deployment flap 140 may comprise the same material from which airbag 110 is formed. Deployment flap 140 is configured to deploy in front of airbag 110 and aid in keeping airbag 110 from getting trapped between an out of position occupant, such as a child in a child car seat and the instrument panel in which the airbag is mounted. Deployment flap 140 may comprise a throat-proximal portion 141 that terminates in a throat-proximal edge 142, and a throat-distal portion 143 that terminates in a throat-distal edge 144; deployment flap 140 also comprises lateral sides 145.

In the depicted embodiment, wrapper 130 and deployment flap 140 are coupled to airbag 110 via throat flap 120. However, in other embodiments, the wrapper and deployment flap may be directly attached to the airbag. Wrapper 130 and deployment flap 140 may be coupled together at their throat-proximal portions 131 and 141 and may be coupled to airbag 110 via stitching 105. In other embodiments, the wrapper and deployment flap may not be coupled together. The relative sizes and shapes of the airbag, wrapper, and deployment flap as depicted in FIG. 1 are for illustrative purposes only, and may vary.

Those skilled in the art will appreciate that a variety of types and configurations of inflatable airbags can be utilized without departing from the scope and spirit of the present disclosure. For example, the size, shape, and proportions of the cushion membrane may vary according to its use in different vehicles or different locations within a vehicle. Also, the inflatable airbag cushion membrane may comprise one or more pieces of any material well known in the art, such as a woven nylon fabric. Additionally, the airbag cushion may be manufactured using a variety of techniques such as one piece weaving, "cut and sew", or a combination of the two techniques. Further, the cushion membrane may be manufactured using sealed or unsealed seams, wherein the seams are formed by stitching, adhesive, taping, radio frequency welding, heat sealing, or any other suitable technique or combination of techniques. The inflatable airbag may comprise one or more vents, which may be configured as discreet vents or dynamic vents. Generally, discreet vents do not change diameter during airbag deployment, and may not vary their capacity to vent inflation gas out the inflatable void of the airbag may not change during deployment. Dynamic vents may change diameter during airbag deployment and may vary their capacity to vent inflation gas out the inflatable void of the airbag may not change during deployment.

Figure 2:
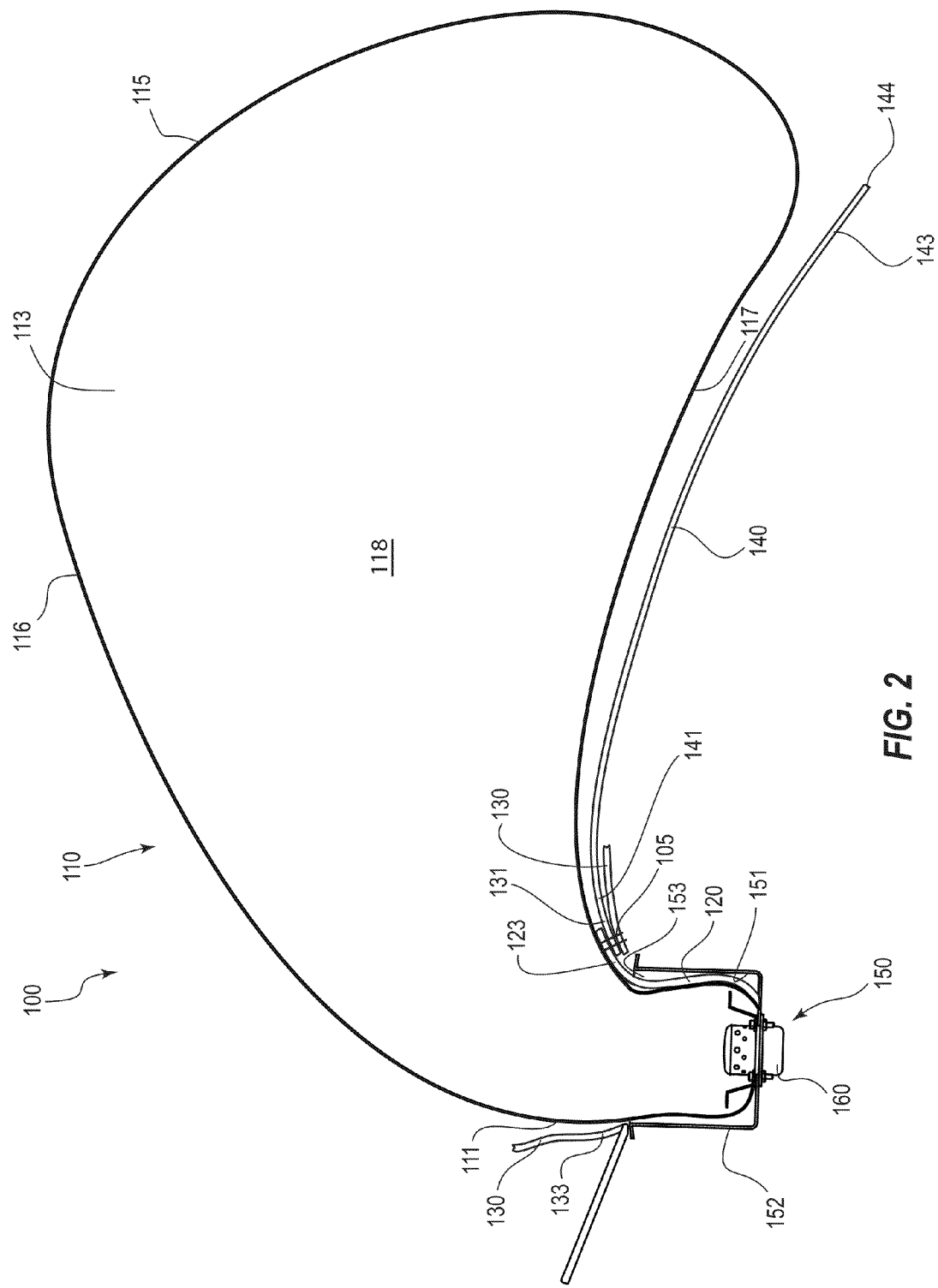
FIG. 2 is a cross-sectional view of the airbag assembly of FIG. 1, wherein the airbag is in a deployed and inflated configuration within a vehicle.

FIG. 2 is a cross-sectional view of airbag assembly 100, wherein the assembly is mounted within a vehicle instrument panel, and airbag 110 is in a deployed and inflated configuration. Airbag 110 is configured to be coupled to an airbag housing 150 via an inflator 160 at throat portion 111 of the airbag. Inflator 160 is configured to fill inflatable void 118 with inflation gas in response to predetermined conditions. Inflatable void 118 may be defined by throat portion 111, front face 115, top face 116, bottom face 117, and side faces (not shown). In the deployed and inflated configuration, throat flap 120 is configured to be located between throat portion 111 and a cabin sidewall 151 of housing 150. Throat proximal portions 131 and 141 of wrapper 130 and deployment flap 140 are coupled to throat-distal portion 123 of throat flap 120 via stitching 105.

Wrapper 130 is configured to be wrapped around the packaged inflatable airbag 110, such that throat proximal portion 131 is located on one side of the airbag, and throat distal portion 133 is on another side of the airbag. Throat-distal portion 133 is configured to be coupled to a windshield sidewall 152 of housing 150. Wrapper 130 is configured to rupture during airbag 110 deployment, such that in the deployed configuration, wrapper 130 is torn in at least two pieces, such that throat-proximal portion 131 is on one side of airbag 110 and throat-distal portion 133 is on another side of the airbag.

Airbag 110 is configured to deploy out of a top side 153 of airbag housing 150 and extend upward and outward toward a cabin of a vehicle. Deployment flap 140 is configured to precede airbag 110 during deployment, such that distal portion 143 initially deploys in front of front face 115 and upon full deployment, the deployment flap is located below bottom face 117 of the airbag. Upon full deployment, distal edge 144 of deployment flap 140 may extend a distance from airbag housing 150 that is similar to front face 115.

Figure 3:
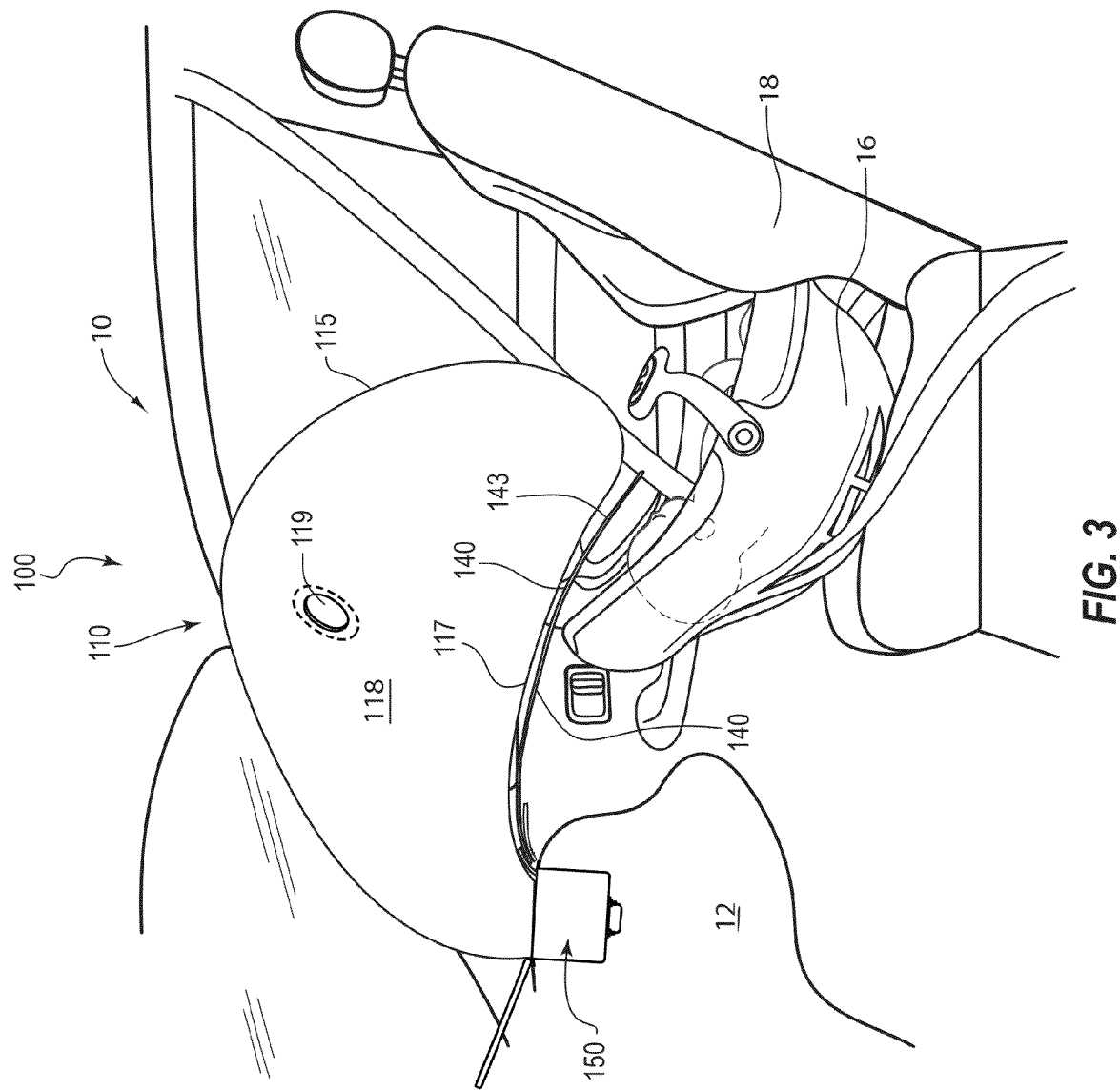
FIG. 3 is a side perspective view of the airbag assembly of FIG. 2, wherein the assembly is mounted in a vehicle and is depicted in a deployed and inflated configuration within a vehicle.

FIG. 3 is a side perspective view of airbag assembly 100, wherein housing 150 has been mounted in an instrument panel 12 of a vehicle 10. A child in a child car seat 16 is located on occupant seat 18, and represents an out-of-position-occupant, which may also be called an "obstruction." Other obstructions may include a child or adult seated too close to instrument panel 12. Airbag 110 is depicted in a deployed configuration, wherein the airbag is coupled to housing 150, and front face 115 is extending into the cabin of a vehicle. Side face 118 of airbag 110 is depicted as having a vent 119. Deployment flap 140 is depicted as being between the out of position occupant and bottom face 117 of airbag 110. Deployment flap 140 is configured such that throat-distal portion 143 precedes front face 115 of airbag 110 such that the airbag does not tend to get between an out of position occupant 16 and instrument panel 12.

Figure 4:
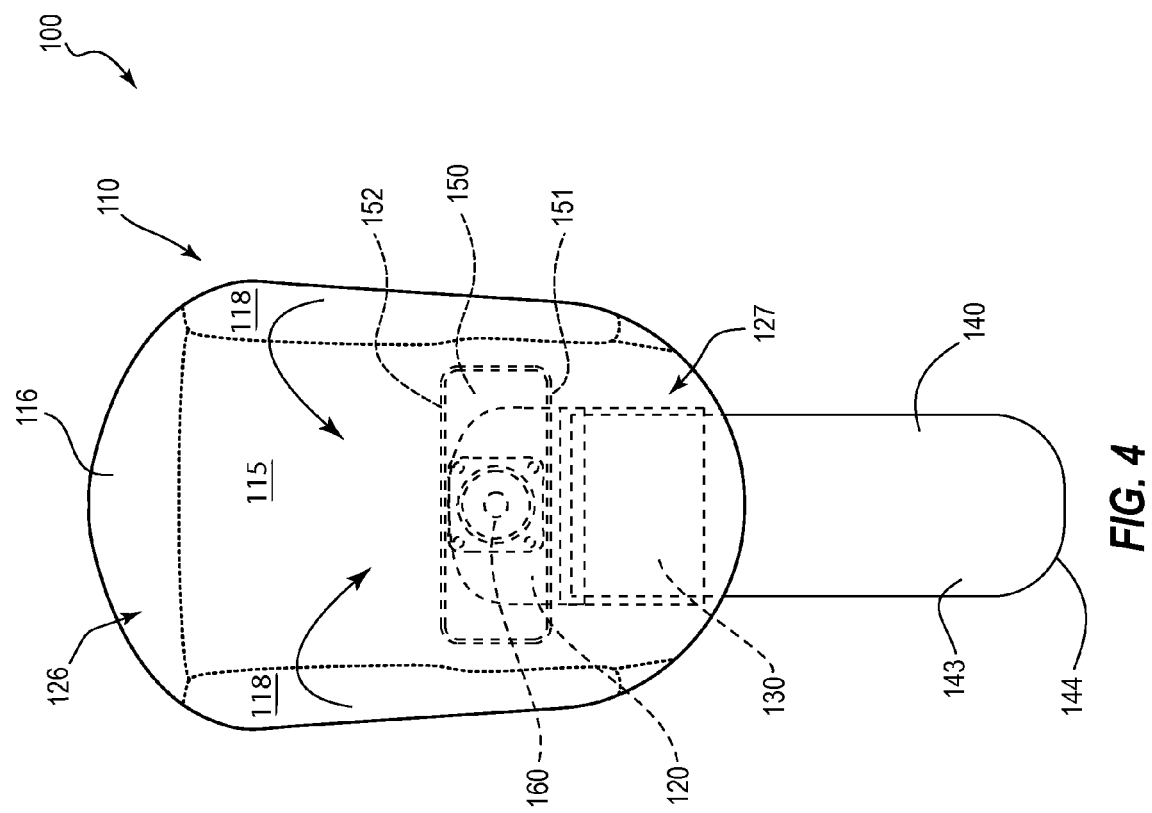
FIG. 4 is a top elevation view of the airbag assembly of FIG. 2 before the airbag and deployment flap have been folded.
Figure 5:
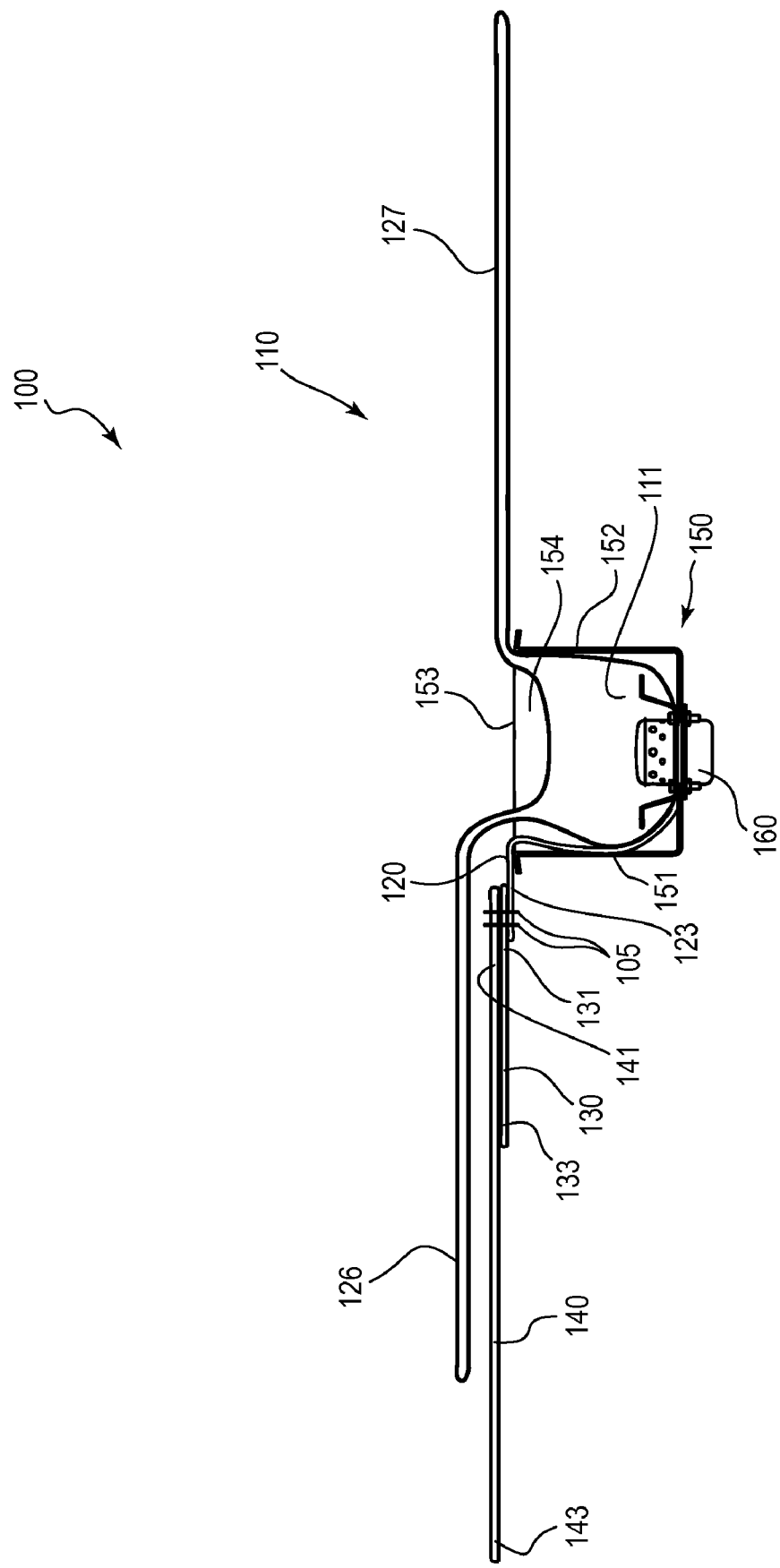
FIG. 5 is a cross-sectional view of the airbag assembly of FIG. 4.

FIGS. 4-13E comprise a method for folding an inflatable airbag and deployment flap. FIGS. 4-5 depict a top elevation view and a cross-sectional view of airbag assembly 110, wherein airbag 110, throat flap 120, wrapper 130, deployment flap 140, housing 150, and inflator 160 are placed in predetermined orientations for packaging. Assembly 100 may be packaged on a work table having a cutout, within which housing 150 may be placed. Airbag 110 may be oriented such that it is in a planar configuration, with front face 115 placed over housing 150, and top face 116 and side faces 118 partially showing. Top face 116 is on the same side of housing 150 as window sidewall 152. Throat flap 120, wrapper 130, and deployment flap 140 are on the same side of the housing as cabin sidewall 151. In the depicted configuration, airbag 110 may be described as having an upper portion 126 and a lower portion 127, wherein the upper portion is located on windshield side 152 of housing 150, and lower portion 127 is on cabin side 151 of housing 150. Throat-distal portion 143 and distal edge 144 of deployment flap 140 extend beyond airbag 110 on the cabin sidewall 151 side of housing 150.

FIG. 5 depicts some features of airbag assembly 100 that are not readily appreciated in FIG. 4. The various sidewalls of housing 150 may form a void 154 into which airbag 110 may be placed via open side 153, after the airbag has been packaged. Throat portion 111 is coupled to housing 150 via inflator 160. Throat distal portion 123 of throat flap 120 is coupled to throat-proximal portions 131 and 141 of wrapper 130 and deployment flap 140 via stitching 105. Distal portions 133 and 143 of wrapper 130 and 140 extend away from cabin side 151 of housing 150.

FIG. 6 is a top elevation view of airbag assembly 100 after side portions 108 of airbag 110 have been folded inwardly, toward housing 150, such that each side portion is folded about ⅓ of the width of airbag 110. Bottom portion 126 may then be folded upwardly, toward housing 150, such that airbag 110 is manipulated into the configuration depicted in FIGS. 7-8.

FIG. 7 is a top elevation view of airbag assembly 100 after bottom portion 126 has been folded upwardly such that the bottom portion no longer crosses cabin sidewall 151 of housing 150, but rather crosses windshield sidewall 152. A distal edge of bottom portion 126 is on the same side of housing 150 as upper portion 127.

Figure 8:
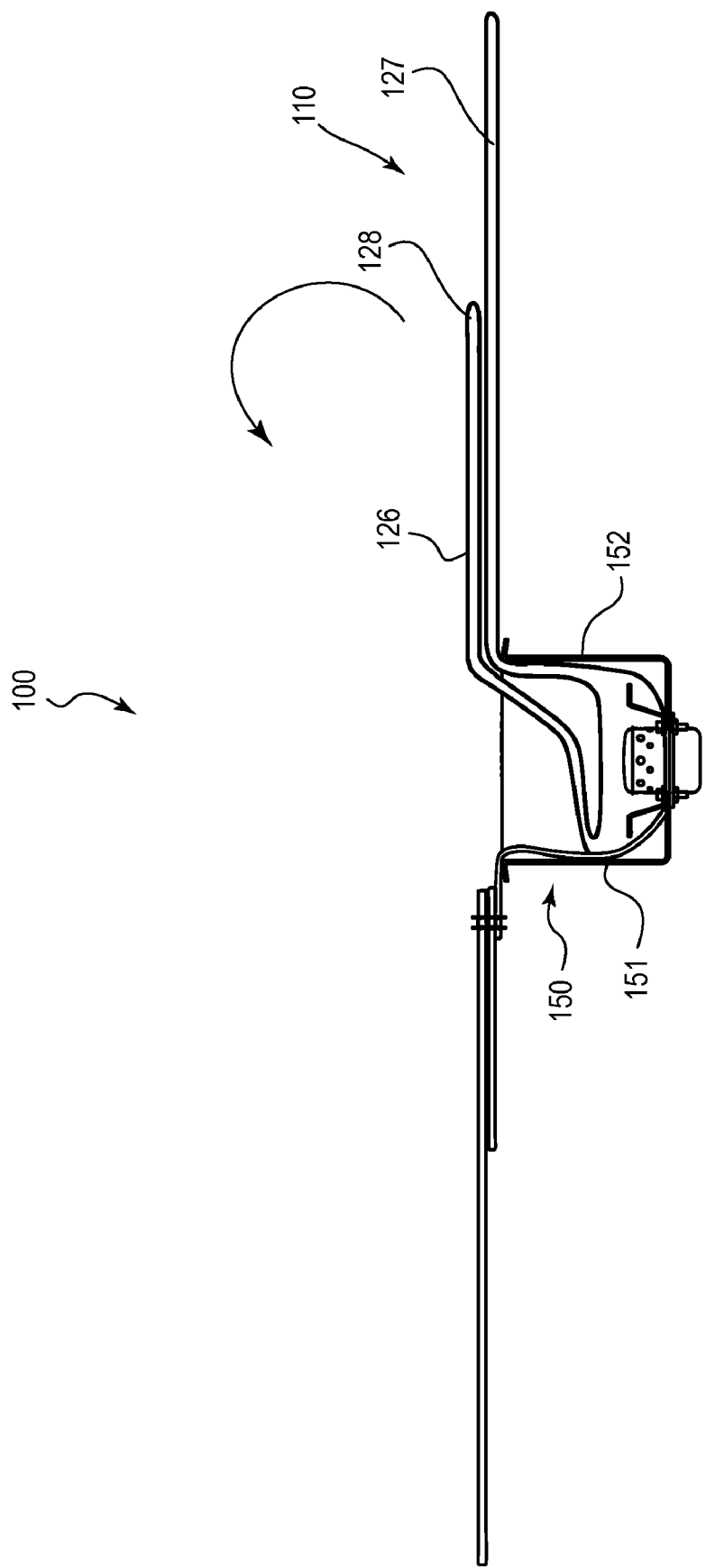
FIG. 8 is a cross-sectional view of the airbag assembly of FIG. 7.

FIG. 8 is a cross-sectional view of the airbag assembly of FIG. 7, wherein airbag 110 is depicted after lower portion 126 has been folded upwardly toward upper portion 127. When folded upwardly, lower portion 126 no longer crosses cabin sidewall 151 of housing 150, but rather crosses windshield sidewall 152. A next step for folding airbag 110 comprises forward-rolling upper portion 126 from distal edge 128 of the upper portion.

Figure 9:
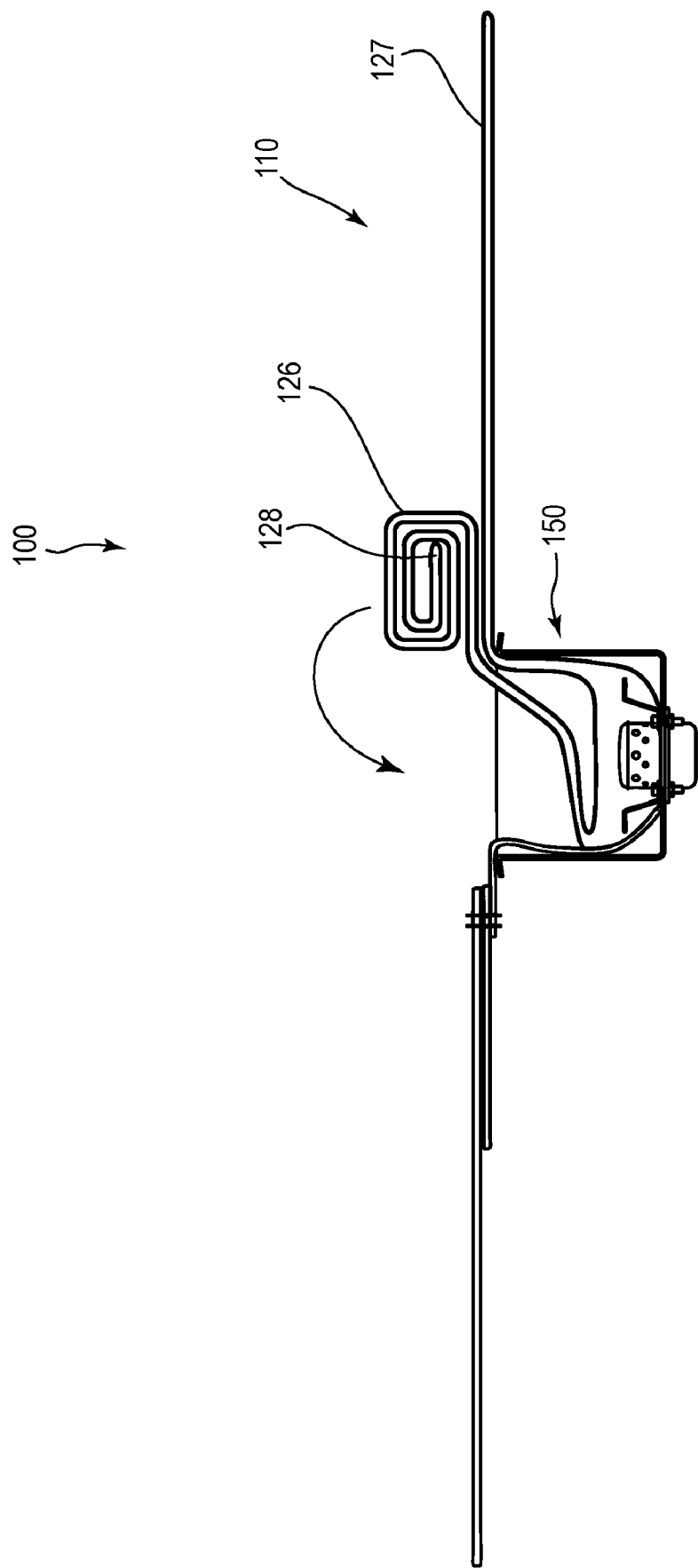
FIG. 9 is a cross sectional view of the airbag assembly of FIG. 8 after the bottom portion has been forward-rolled.

FIG. 9 is a cross-sectional view of the airbag assembly of FIG. 8 after upper portion 126 has been forward-rolled. Upper portion 126 may be forward rolled by a first fold being formed at a predetermined distance from distal edge 128 of the upper portion, and the distal edge being directed toward housing 150 in a direction that is away from upper portion 127.

Figure 10:
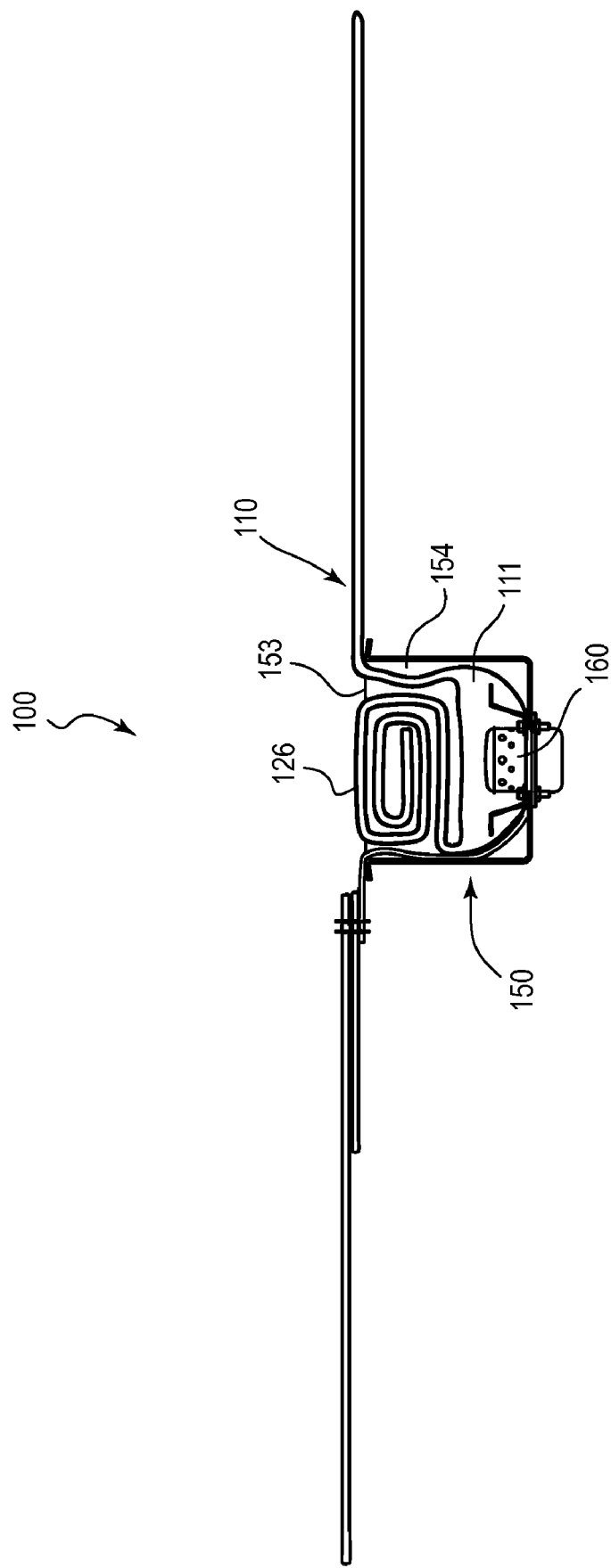
FIG. 10 is a cross-sectional view of the airbag assembly of FIG. 9 after the forward-rolled bottom portion has been placed within an airbag housing.

FIG. 10 is a cross-sectional view of the airbag assembly 100 after forward rolled upper portion 126 has been placed within housing 150. As described herein, housing 150 comprises a plurality of walls that form an interior void 154 that has an open top side 153. After being forward rolled, upper portion 126 may be placed on top of throat portion 111 and inflator 160.

Figure 11:
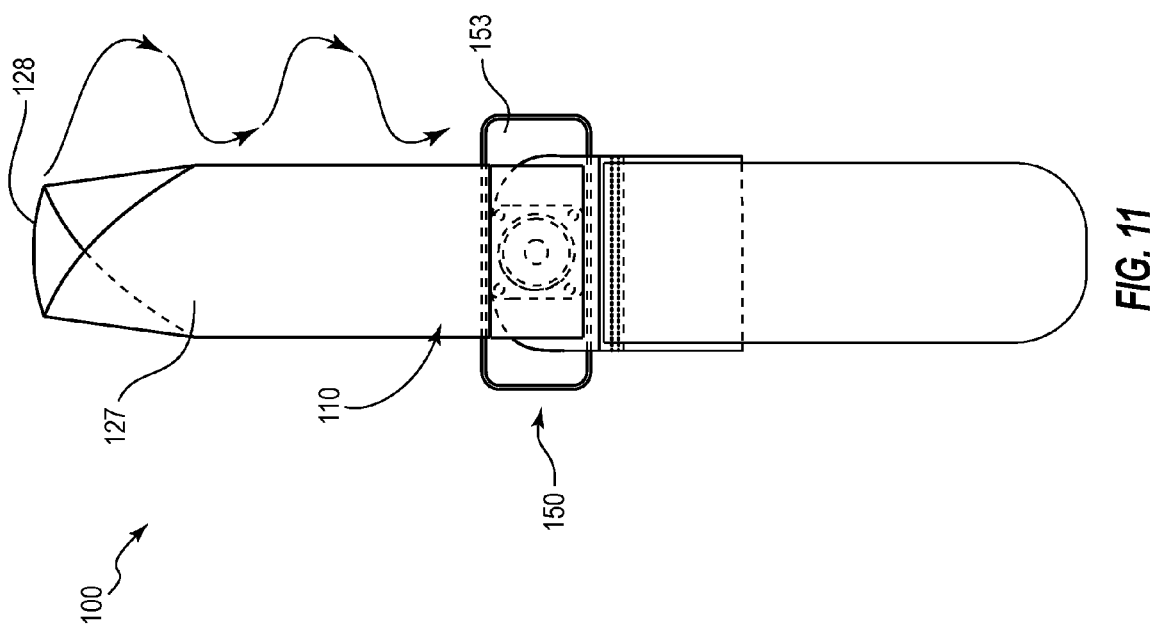
FIG. 11 is a top elevation view of the airbag assembly of FIG. 10.

FIG. 11 is a top elevation view that depicts a next step in a method for packaging airbag assembly 100, wherein upper portion 127 is accordion-folded. Upper portion 127 may be folded at a predetermined distance from distal edge 128 in a direction that is away from open side 153 of housing 150. Upper portion 127 may continue to be accordion-folded a predetermined number of times. Accordion-folds are formed by making consecutive folds in directions that vary by 180°.

Figure 12:
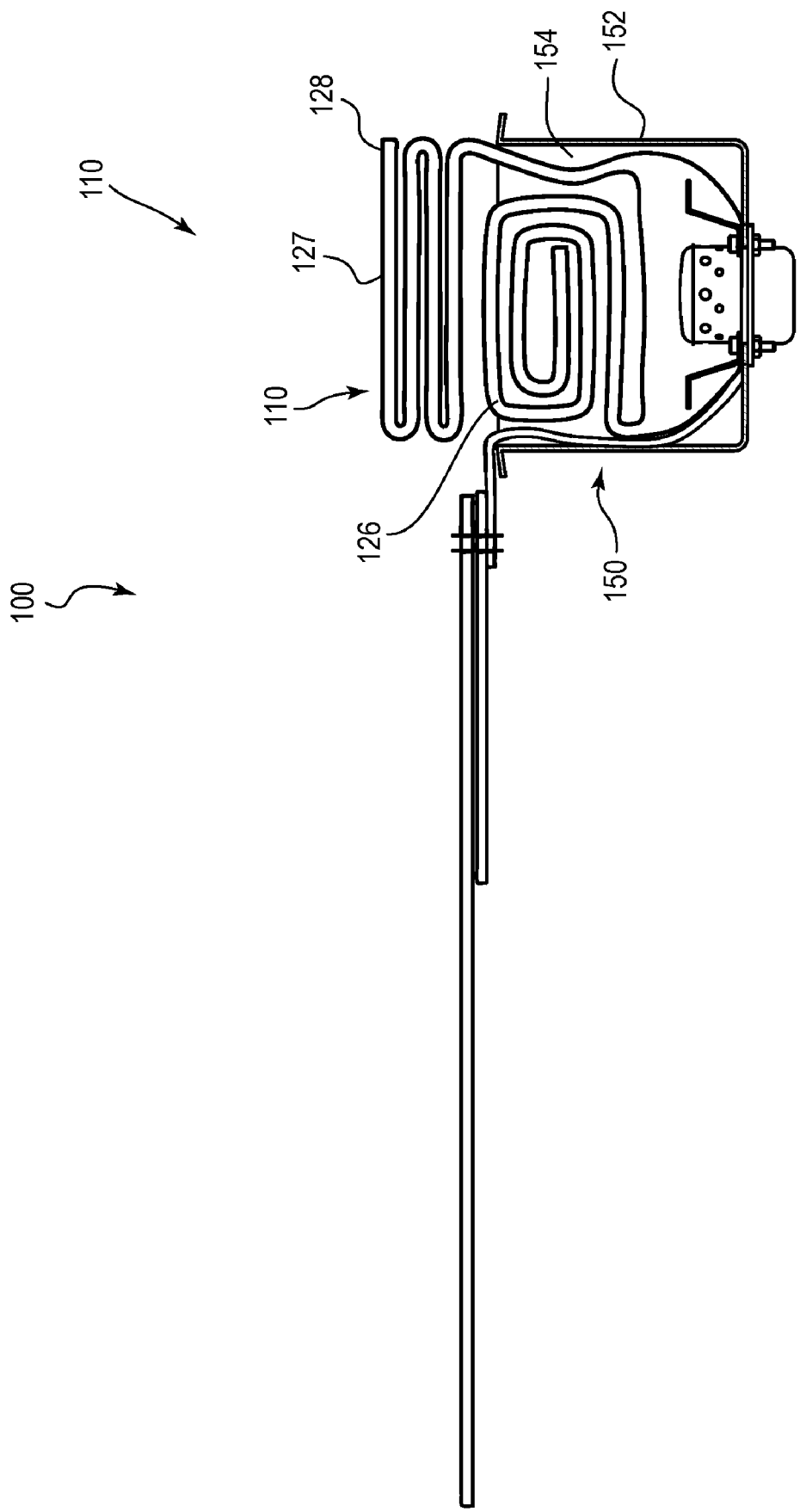
FIG. 12 is a cross-sectional view of the airbag assembly of FIG. 11 after a top portion of the airbag has been accordion-folded.

FIG. 12 is a cross-sectional view of airbag assembly 100 after upper portion 127 has been accordion-folded and placed on top of forward-rolled lower portion 127 within void 154 of housing 150. Accordion-folded upper portion 127 is oriented such that distal edge 128 is on the windshield sidewall 152 side of housing 150.

Figure 13B:
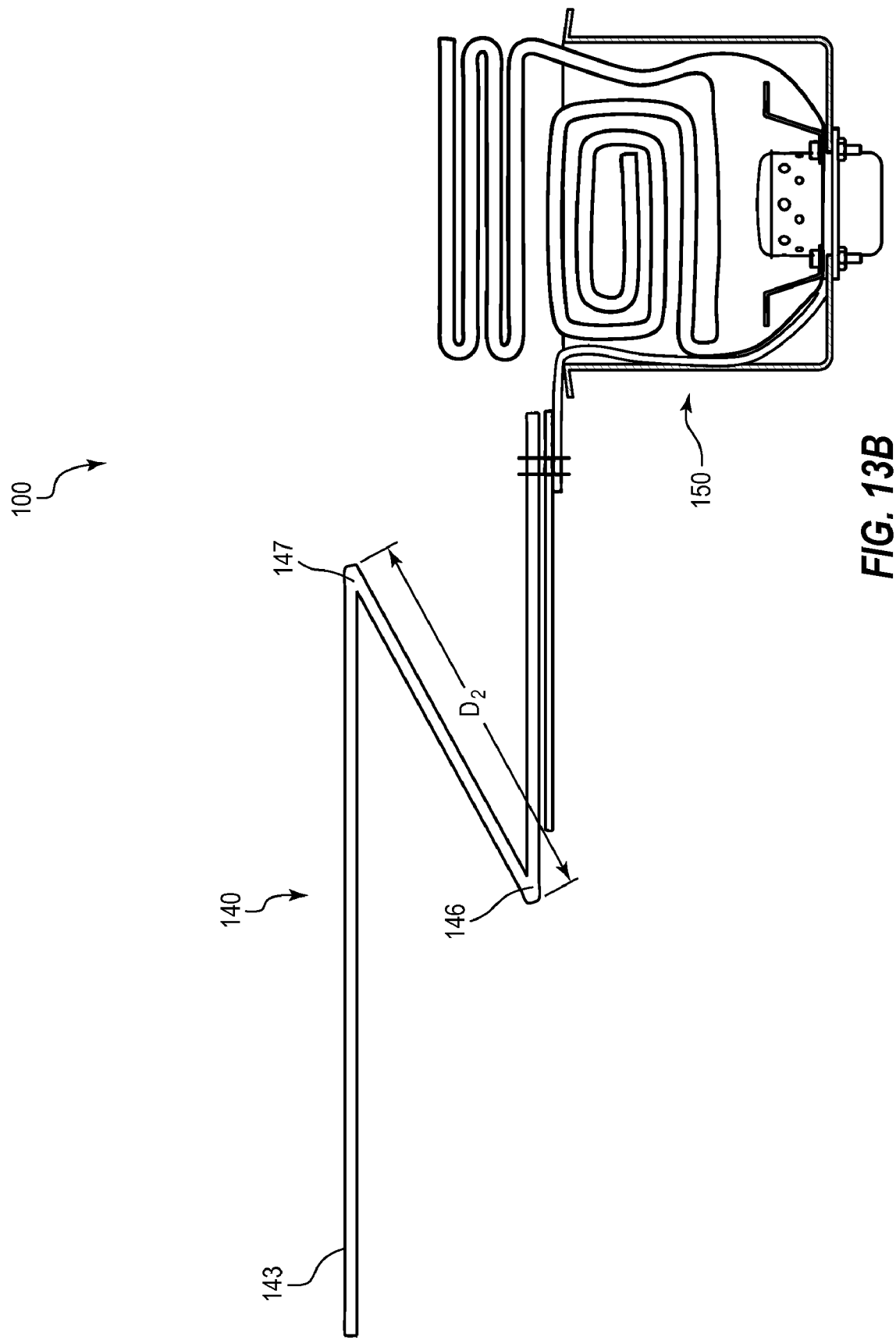
FIG. 13B is a cross-sectional view of the airbag assembly of FIG. 13A after another accordion-fold has been formed in the deployment flap.

FIGS. 13A-13F depict a method for folding a deployment flap. FIGS. 13A-13F also depict a method for packaging a deployment flap. Deployment flap 140 may be packaged by accordion-folding and forward folding. FIG. 13A depicts a first accordion-fold 146 being formed in deployment flap 140 of airbag assembly 100. First accordion fold 146 may be formed a predetermined distance $D_1$ from proximal edge 142 of deployment flap 140, wherein the fold is made such that distal portion 143 is directed toward open side 153 of housing 150. First accordion-fold 146 may be made a predetermined distance from stitching 105, rather than distal edge 142. First accordion-fold 146 is made such that wrapper 130 is not folded with deployment flap 140.

FIG. 13B is a cross-sectional view of airbag assembly 100 after a second accordion-fold 147 has been made in deployment flap 140. Second accordion-fold 147 may be made a predetermined distance $D_2$ from first accordion-fold 146. Second accordion fold 147 is made such that distal portion 143 is directed away from housing 150. In other words, second accordion-fold 147 orients distal portion 143 in a position that is 180° opposite of the direction of first accordion-fold 146. Distances $D_1$ and $D_2$ may be identical.

Figure 13C:
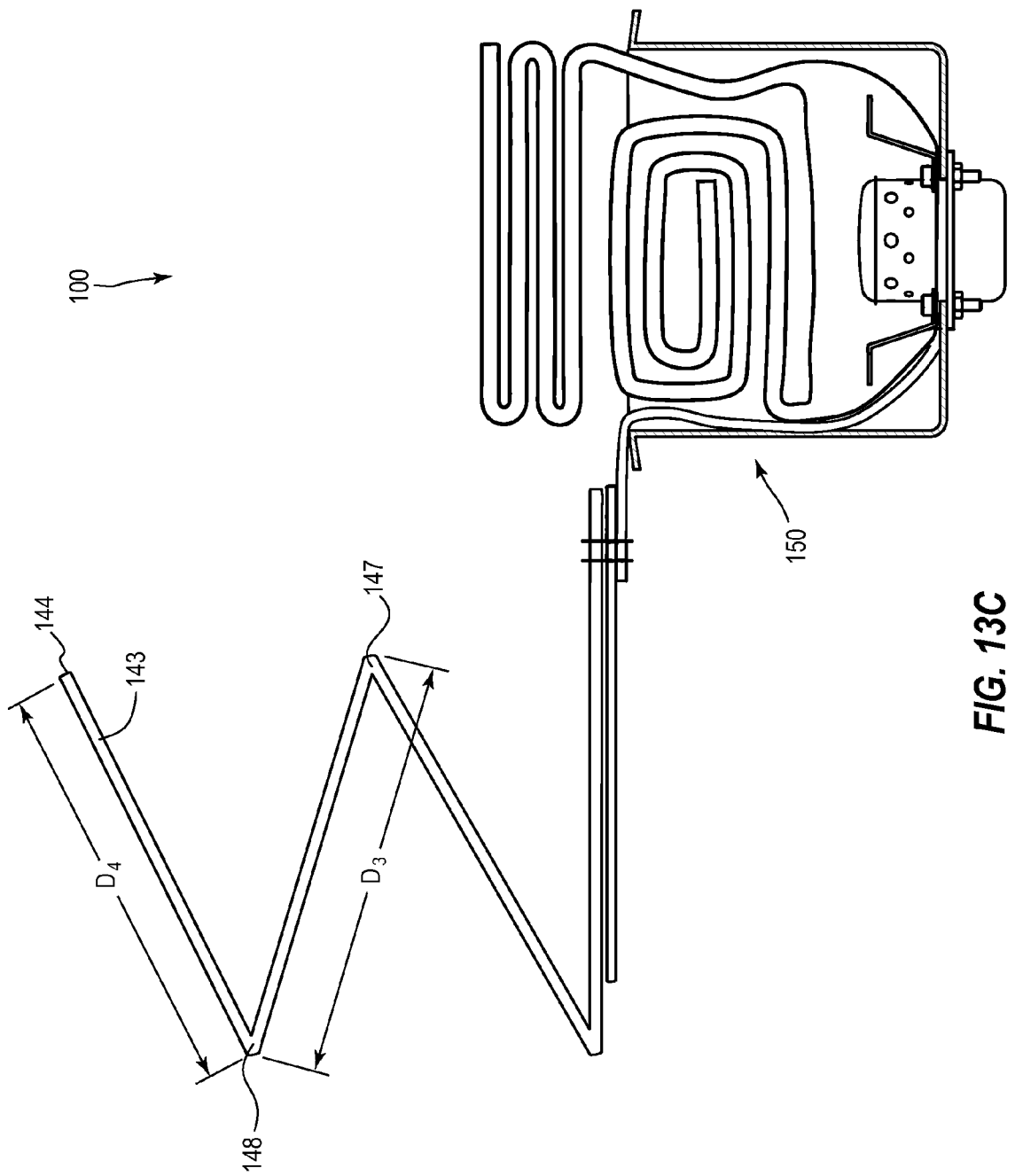
FIG. 13C is a cross-sectional view of the airbag assembly of FIG. 13B after another accordion-fold has been formed in the deployment flap.

FIG. 13C is a cross-sectional view of airbag assembly 100 after a third accordion-fold 148 has been made in deployment flap 140. Third accordion-fold 148 may be made a predetermined distance $D_3$ from second accordion-fold 147. Third accordion fold 148 is made such that distal portion 143 is directed toward housing 150. In other words, third accordion-fold 148 orients distal portion 143 in a position that is 180° opposite of the direction of second accordion-fold 147. Distances $D_2$ and $D_3$ may be identical. In the depicted embodiment, an entire length of deployment flap 140 is formed into accordion folds, such that a distance $D_4$ from third accordion fold to distal edge 144 is the same as distance $D_3$. In other embodiments, the deployment flap may be folded more or fewer than 3 times, and the distances between folds may vary.

Figure 13D:
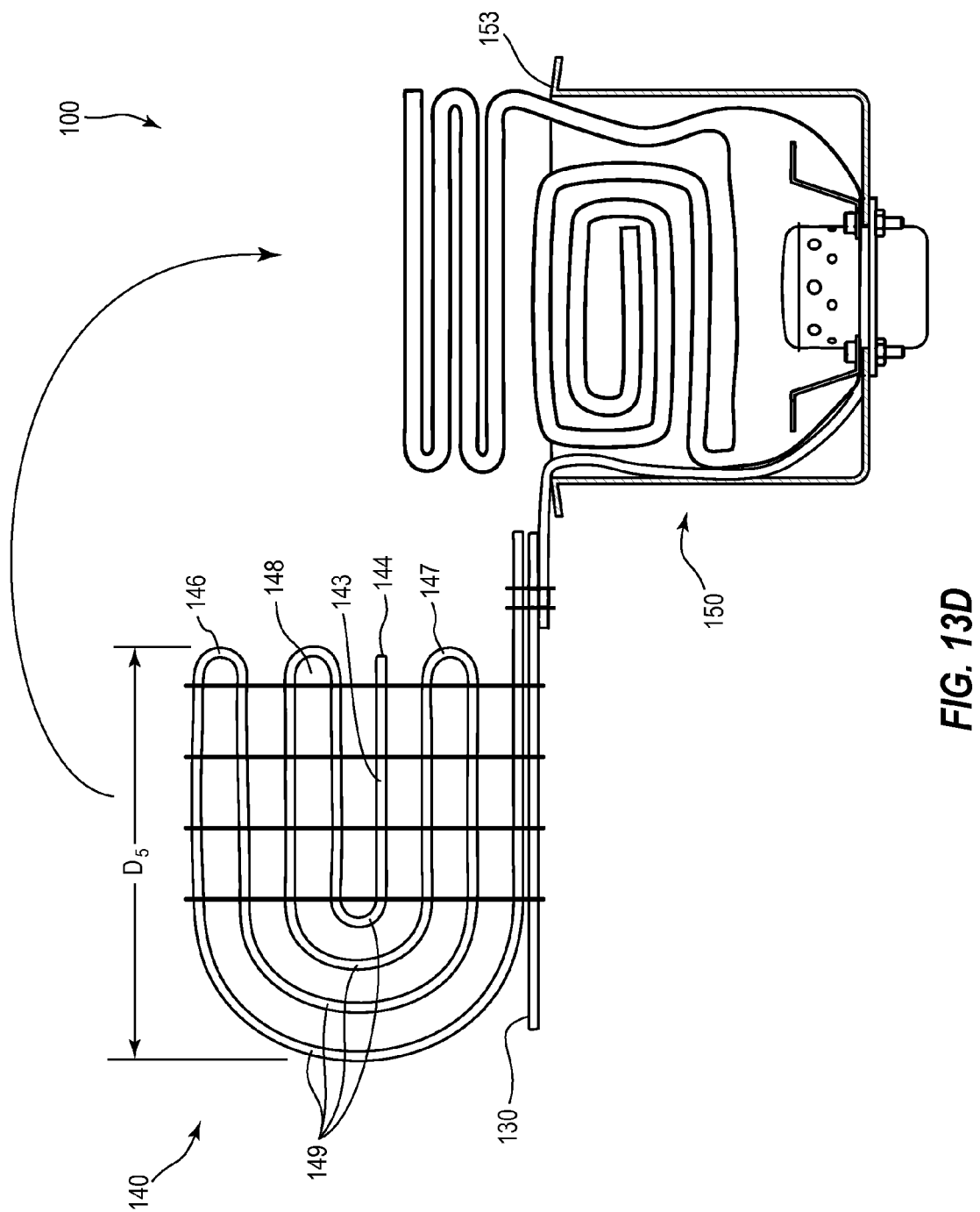
FIG. 13D is a cross-sectional view of the airbag assembly of FIG. 13C after the accordion-folded deployment flap has been folded.

FIG. 13D is a cross-sectional view of airbag assembly 100 after a forward fold 149 has been formed in accordion-folded deployment flap 140. After deployment flap 140 has been accordion-folded, the flap may comprise first, second, and third accordion folds 146, 147, and 148. A next step in a method for folding the deployment flap may comprise forward-folding deployment flap 140 such that distal portion 143 and distal edge 144 are positioned between second and third accordion-folds 147 and 148. In the depicted embodiment, forward-fold 149 is made in a direction that is towards open top side 153 of housing 150, wherein the forward-fold comprises a distance $D_5$ that is about ½ the length of accordion-folded deployment flap 140. Distances for $D_1$-$D_4$ may each be from about 40 mm to about 200 mm. Distance $D_5$ may be from about 20 mm to about 100 mm. Assembly 100 may further comprise tack stitching 109, which can extend through the wrapper and all folded layers of the deployment flap. Tack stitching 109 is configured to rupture or breakaway during inflatable airbag deployment.

Figure 13E:
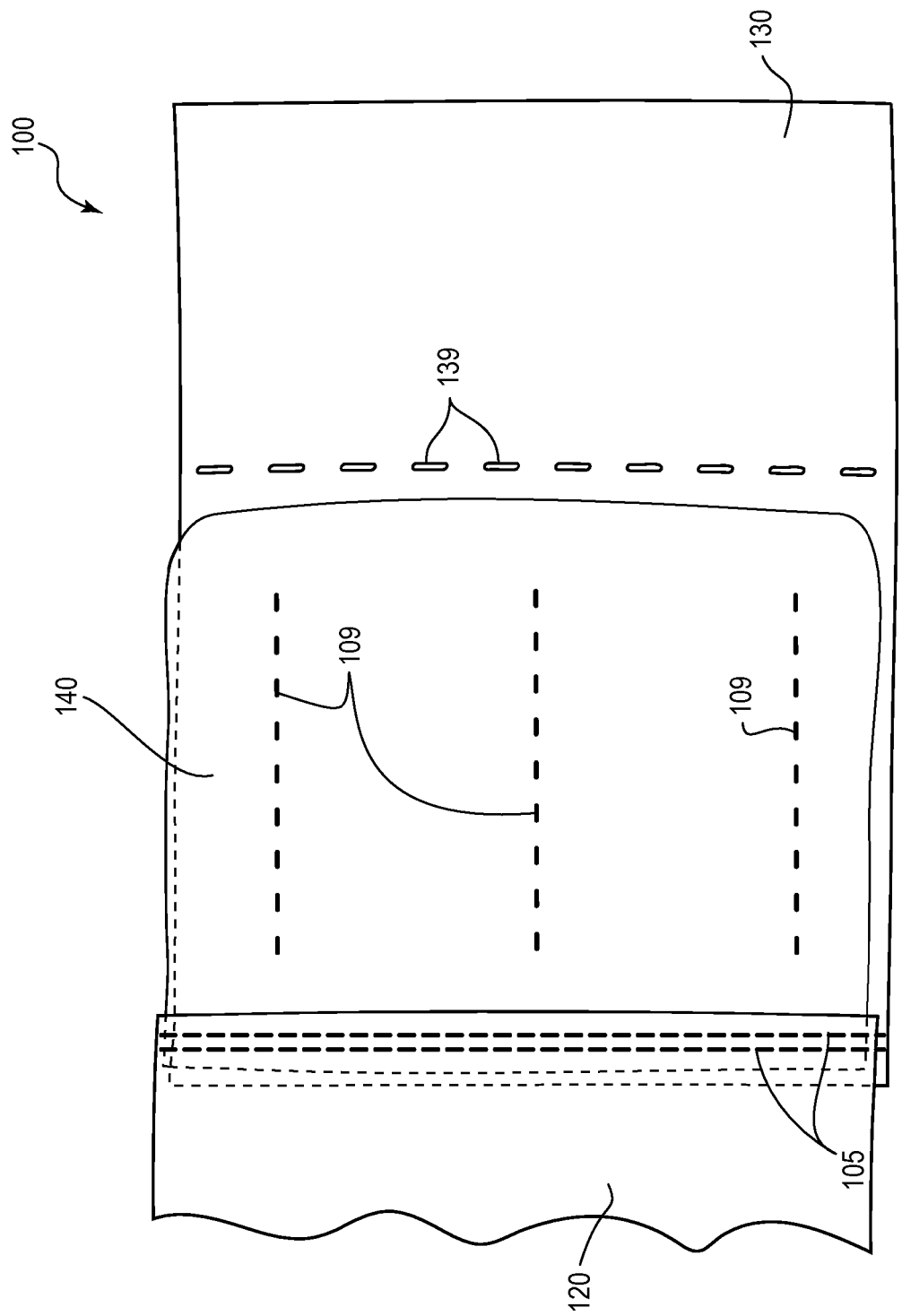
FIG. 13E is a top elevation view of a portion of the airbag assembly of FIG. 13D.

FIG. 13E is a top elevation view of a portion of inflatable airbag assembly 100 after deployment flap 140 has been placed in the packaged configuration and breakaway tack stitching 109 has been sewn through the deployment flap and wrapper 130. Wrapper 130 may also comprise perforations 139, which are configured to rupture during inflatable airbag deployment. As noted above, throat flap 120 is coupled to wrapper 130 and deployment flap 140 via stitching 105. Tack stitching 109 is depicted as three discrete columns of stitching; however, assembly 100 may only have a center column of tack stitching or two outside columns of tack stitching, which may be called tack stitching on the lateral sides of the deployment flap.

Figure 13F:
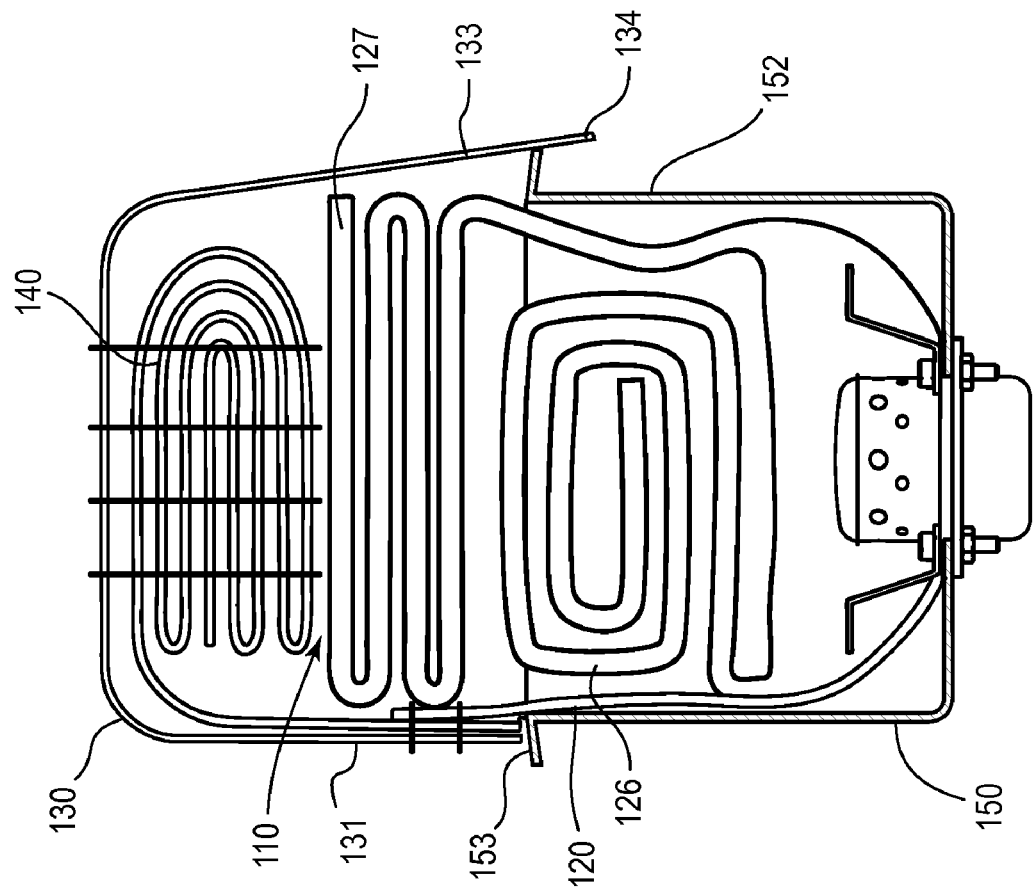
FIG. 13F is a cross-sectional view of the airbag assembly of FIG. 13D after a wrapper has been wrapped around the packaged airbag.

FIG. 13F is a cross sectional view depicting the packaged configuration of airbag 110, throat flap 120, wrapper 130, and deployment flap 140. FIG. 13F also illustrates a next step in a method for packaging airbag assembly 100. After deployment flap 140 has been accordion-folded and forward-folded, it may be placed on top of accordion-folded upper portion 126 of airbag 110. Wrapper 130 may then be wrapped around deployment flap 140 and airbag 110, such that distal edge 134 of distal portion 133 is adjacent to windshield sidewall 152 of housing 150. Distal portion 133 may then be coupled to windshield sidewall 152 such that deployment flap 140 and airbag 110 are retained in their packaged configurations. For clarity, FIG. 13F depicts airbag 110 and deployment flap 140 as extending beyond top portion 153 of housing 150. One skilled in the art will recognize that in the packaged configuration, the airbag and/or deployment flap may not extend above the top of the airbag housing. Each column of tack stitching may extend from about 10 mm to about 60 mm.

Any methods disclosed herein comprise one or more steps or actions for performing the described method. The method steps and/or actions may be interchanged with one another. In other words, unless a specific order of steps or actions is required for proper operation of the embodiment, the order and/or use of specific steps and/or actions may be modified.

Reference throughout this specification to "an embodiment" or "the embodiment" means that a particular feature, structure or characteristic described in connection with that embodiment is included in at least one embodiment. Thus, the quoted phrases, or variations thereof, as recited throughout this specification are not necessarily all referring to the same embodiment.

Similarly, it should be appreciated that in the above description of embodiments, various features are sometimes grouped together in a single embodiment, figure, or description thereof for the purpose of streamlining the disclosure. This method of disclosure, however, is not to be interpreted as reflecting an intention that any claim require more features than those expressly recited in that claim. Rather, as the following claims reflect, inventive aspects lie in a combination of fewer than all features of any single foregoing disclosed embodiment. Thus, the claims following this Detailed Description are hereby expressly incorporated into this Detailed Description, with each claim standing on its own as a separate embodiment. This disclosure includes all permutations of the independent claims with their dependent claims.

Recitation in the claims of the term "first" with respect to a feature or element does not necessarily imply the existence of a second or additional such feature or element. Elements recited in means-plus-function format are intended to be construed in accordance with 35 U.S.C. §112 ¶ 6. It will be apparent to those having skill in the art that changes may be made to the details of the above-described embodiments without departing from the underlying principles of the invention. Embodiments of the invention in which an exclusive property or privilege is claimed are defined as follows.

The invention claimed is:

1. A method for packaging an inflatable airbag assembly, comprising the steps of:
    providing an inflatable airbag having a throat portion, wherein a wrapper and a deployment flap are coupled to the throat portion, such that a portion of the deployment flap is located between the wrapper and the inflatable airbag;
    providing an inflatable airbag housing that is coupled to the inflatable airbag at the throat portion of the inflatable airbag;
    folding the inflatable airbag into the inflatable airbag housing;
    making a first accordion-fold in the deployment flap toward the throat portion of the inflatable airbag, wherein the first accordion-fold is at a predetermined distance from a throat-proximal edge of the deployment flap,
    making a second accordion-fold in an opposite direction of the first accordion-fold, wherein the second accordion-fold is at a predetermined distance from the first accordion-fold,
    folding the accordion-folded deployment flap after making the second accordion-fold;
    placing the folded and accordion-folded deployment flap within the inflatable airbag housing on top of the folded inflatable airbag, such that during inflatable airbag deployment the deployment flap deploys in front of the inflatable airbag;
    wrapping a free end of the wrapper around the folded and accordion-folded deployment flap; and,
    coupling the wrapper to the inflatable airbag housing such that the inflatable airbag and deployment flap are retained within the inflatable airbag housing.

2. The method of claim 1, further comprising accordion-folding the deployment flap until an entire length of the deployment flap is folded.

3. The method of claim 1, wherein the step of placing the folded and accordion-folded deployment flap within the inflatable airbag housing on top of the folded inflatable airbag comprises forward rolling the folded and accordion-folded deployment flap.

4. The method of claim 3, wherein the method further comprises the step of tack-stitching the folded and accordion-folded deployment flap.

5. The method of claim 4, wherein the step of tack stitching the folded and accordion-folded deployment flap comprises tack-stitching a middle portion of the folded and accordion-folded deployment flap.

6. The method of claim 1, wherein the first accordion-fold is made in a direction that is toward the inflatable airbag housing and is oriented such that the fold is made toward a top side of the inflatable airbag housing.

7. The method of claim 1, wherein the second accordion-fold is made in a direction that is away from the inflatable airbag housing.

8. The method of claim 1, wherein the method further comprises the step of making a third accordion-fold in an opposite direction of the second accordion-fold, such that the first and third accordion-folds are oriented in the same direction, wherein the third accordion-fold is at a predetermined distance from the second accordion-fold.

9. The method of claim 8, wherein each of the first, second, and third accordion-folds divide the deployment flap into four equal parts.

10. The method of claim 1, further comprising the steps of:
    folding each of two side portions of the airbag toward the housing;
    forward-rolling a lower portion of the inflatable airbag;
    accordion-folding an upper portion of the inflatable airbag.

11. The method of claim 10, wherein the step of folding each of two side portions of the airbag toward the housing comprises folding about ⅓ of a width of the airbag on each side toward the housing such that a folded width of the inflatable airbag comprises a width that is less than a width of the airbag housing.

12. The method of claim 10, wherein the step of forward rolling the lower portion comprises forward rolling the first portion four times.

13. The method of claim 10, wherein the step of accordion-folding the upper portion comprises accordion-folding the upper portion three times.

14. A method for packaging an inflatable airbag assembly, comprising the steps of:
    providing an inflatable airbag having a throat portion, wherein a wrapper and a deployment flap are coupled to the throat portion, such that a portion of the deployment flap is located between the wrapper and the inflatable airbag;

providing an inflatable airbag housing that is coupled to the inflatable airbag at the throat portion of the inflatable airbag;

folding the inflatable airbag into the inflatable airbag housing;

accordion-folding the deployment flap;

folding the accordion-folded deployment flap at a middle of the accordion-folded deployment flap in a direction that is toward a top side of the inflatable airbag housing, such that a folded width of the accordion folded deployment flap is about half of an unfolded width of the accordion-folded deployment flap;

placing the folded and accordion-folded deployment flap within the inflatable airbag housing on top of the folded inflatable airbag, such that during inflatable airbag deployment the deployment flap deploys in front of the inflatable airbag;

wrapping a free end of the wrapper around the folded and accordion-folded deployment flap; and, coupling the wrapper to the inflatable airbag housing such that the inflatable airbag and deployment flap are retained within the inflatable airbag housing.

15. The method of claim 14 wherein the step of placing the folded and accordion-folded deployment flap within the inflatable airbag housing on top of the folded inflatable airbag comprises forward rolling the folded and accordion-folded deployment flap.

16. The method of claim 14 wherein the method further comprises the step of tack-stitching the folded and accordion-folded deployment flap.

17. A method for packaging an inflatable airbag assembly, comprising the steps of:

providing an inflatable airbag having a throat portion, wherein a wrapper and a deployment flap are coupled to the throat portion, such that a portion of the deployment flap is located between the wrapper and the inflatable airbag;

providing an inflatable airbag housing that is coupled to the inflatable airbag at the throat portion of the inflatable airbag;

folding the inflatable airbag into the inflatable airbag housing;

accordion-folding the deployment flap;

tack-stitching each lateral side of the folded and accordion-folded deployment flap;

placing the folded and accordion-folded deployment flap within the inflatable airbag housing on top of the folded inflatable airbag, such that during inflatable airbag deployment the deployment flap deploys in front of the inflatable airbag;

wrapping a free end of the wrapper around the folded and accordion-folded deployment flap; and, coupling the wrapper to the inflatable airbag housing such that the inflatable airbag and deployment flap are retained within the inflatable airbag housing.

18. The method of claim 17, wherein the step of accordion-folding the deployment flap comprises continuing to accordion-fold the deployment flap until an entire length of the deployment flap is folded.

19. The method of claim 17, wherein the step of accordion-folding the deployment flap comprises making a first accordion-fold in the deployment flap toward a throat portion of the inflatable airbag, wherein the first accordion-fold is at a predetermined distance from a throat-proximal edge of the deployment flap.

20. The method of claim 19, wherein the first accordion-fold is made in a direction that is toward the inflatable airbag housing and is oriented such that the fold is made toward a top side of the inflatable airbag housing.

21. The method of claim 19, wherein the method further comprises the step of making a second accordion-fold in an opposite direction of the first accordion-fold, wherein the second accordion-fold is at a predetermined distance from the first accordion-fold.

22. The method of claim 21, wherein the second accordion-fold is made in a direction that is away from the inflatable airbag housing.

23. The method of claim 21, wherein the method further comprises the step of making a third accordion-fold in an opposite direction of the second accordion-fold, such that the first and third accordion-folds are oriented in the same direction, wherein the third accordion-fold is at a predetermined distance from the second accordion-fold.

24. The method of claim 23, wherein the third accordion-fold is made in a direction that is toward the inflatable airbag housing and is oriented such that the fold is made toward a top side of the inflatable airbag housing.

25. The method of claim 23, wherein each of the first, second, and third accordion-folds divide the deployment flap into four equal parts.

26. The method of claim 17, wherein the step of folding the accordion-folded deployment flap comprises making a fold in a middle portion of the accordion-folded deployment flap in a direction that is toward a top side of the inflatable airbag housing.

27. The method of claim 26, wherein the step of making a fold in a middle portion of the accordion-folded deployment flap comprises forming a fold at a middle of the accordion-folded deployment flap, such that a folded width of the accordion folded deployment flap is about half of an unfolded width of the accordion-folded deployment flap.

28. The method of claim 17, wherein the step of placing the folded and accordion-folded deployment flap within the inflatable airbag housing on top of the folded inflatable airbag comprises forward rolling the folded and accordion-folded deployment flap on top of the folded inflatable airbag.

* * * * *